(No Model.) 2 Sheets—Sheet 1.
W. DAVIS.
CULTIVATOR.
No. 432,021. Patented July 15, 1890.
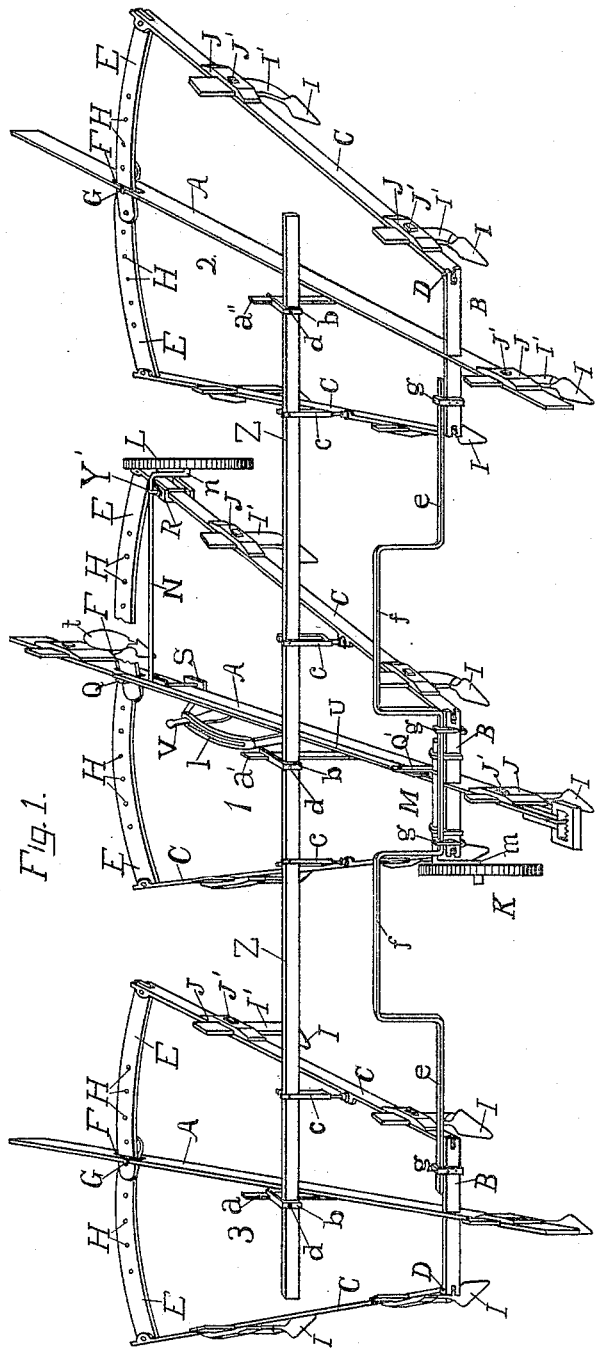
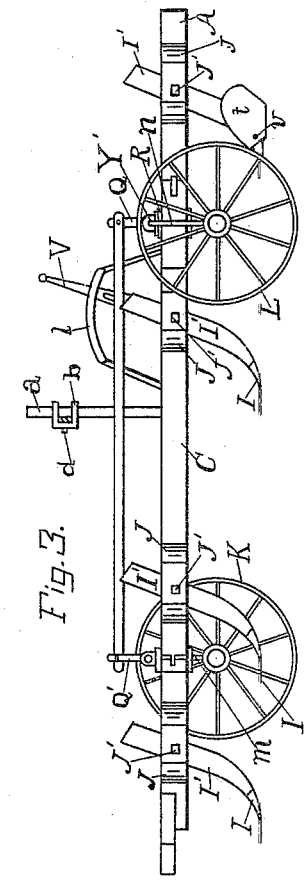
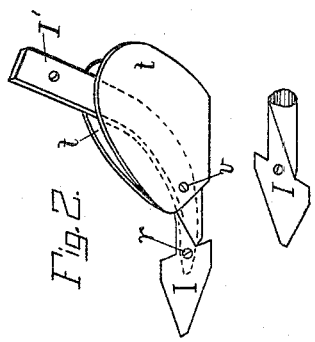
Witnesses
M. C. Goler.
J. Findlayson.
Inventor
William Davis
by Hazard & Townsend
his attys.

(No Model.) 2 Sheets—Sheet 2.
W. DAVIS.
CULTIVATOR.
No. 432,021. Patented July 15, 1890.
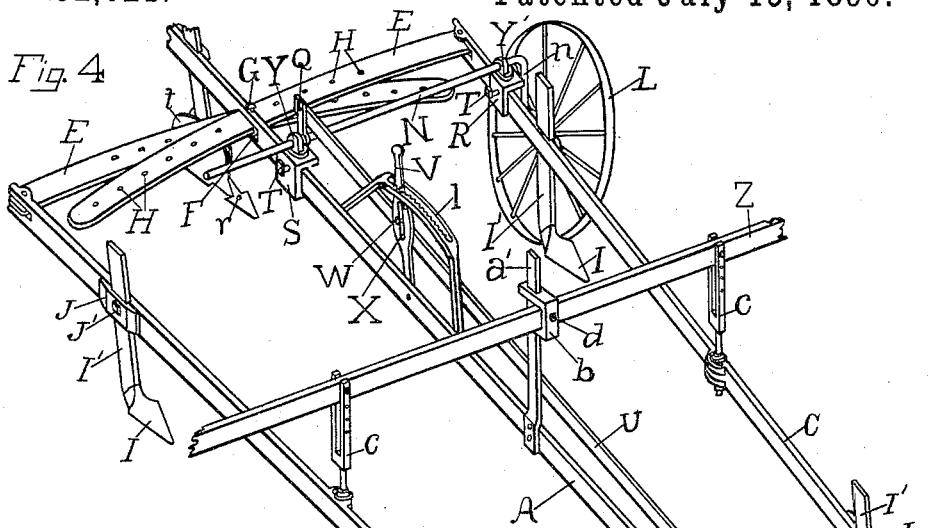
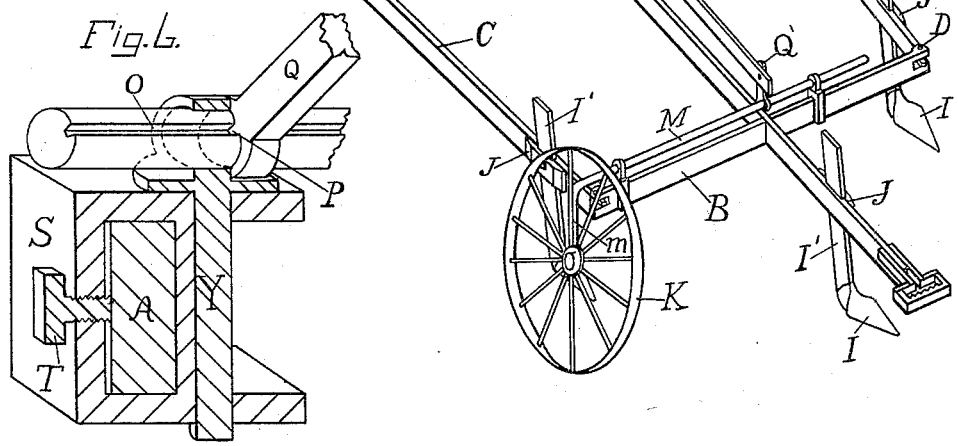
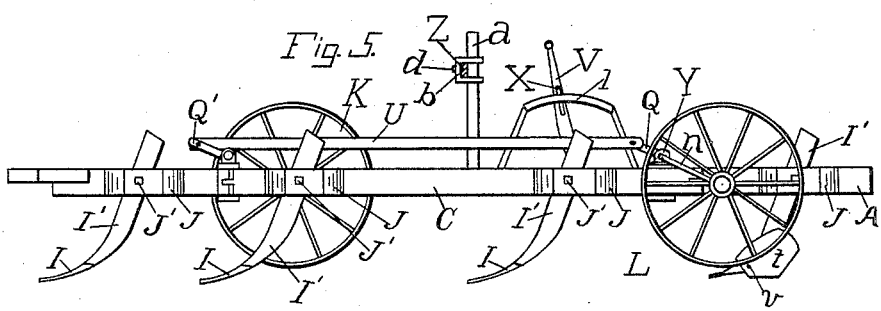
Witnesses
Inventor
William Davis

UNITED STATES PATENT OFFICE.

WILLIAM DAVIS, OF LOS ANGELES, CALIFORNIA.

CULTIVATOR.

SPECIFICATION forming part of Letters Patent No. 432,021, dated July 15, 1890.

Application filed October 16, 1889. Serial No. 327,235. (No model.)

*To all whom it may concern:*

Be it known that I, WILLIAM DAVIS, a citizen of the United States, residing at Los Angeles, in the county of Los Angeles and State of California, have invented a new and useful Improvement in Cultivators, of which the following is a specification.

The object of my invention is to provide means whereby the cultivator can be adjusted to cultivate a greater or less width of land, and also to provide means whereby several strips of land of a desired width may be cultivated at the same time, so as to adapt the cultivator for use in cultivating between plant-rows of different widths.

A further object is to provide means for gaging the depth of the cultivation.

My invention consists of a series of independent members or cultivators adjustable as to width and connected together by adjustable means, whereby I am enabled to regulate the width of the land cultivated by the entire cultivator and by each one of such members, and whereby I am also enabled to regulate the width of the land uncultivated between such members, and whereby the cultivator is adapted for use in cultivating corn and other plants growing in rows.

The accompanying drawings illustrate my invention.

Figure 1 is a view of my improved cultivator adjusted to cultivate to the greatest width for which it is adapted. Fig. 2 is a view of the rear central cultivator-blade adapted for use where it is desired to leave a furrow in the ground cultivated for irrigation-furrows or for banking up potatoes or corn. Fig. 3 is a side elevation of the middle member of the cultivator with the blades raised out of contact with the ground. Fig. 4 is a perspective view of the middle member of the cultivator contracted to cultivate a narrow land, the blades being raised out of contact with the ground. Fig. 5 is a side view of the middle member of the cultivator with the blades lowered to enter the ground. Fig. 6 is a detail of a section of the axle M N, illustrating the means for connecting the same with the operating-lever and with the central beam A.

The frame of each member of the cultivator is constructed with a central beam A extending from the front to the rear of the cultivator. Near the front end of this beam a cross-bar B is fixed at right angles to such beam. This bar is of a length corresponding to the width desired for the front of the member or separate cultivator, and the front end of side bars C are hinged to the ends of the cross-bar B by hinges D. To the rear ends of side bars C are hinged perforated braces E, which pass through a slot F near the rear end of the central beam A, in which such braces are secured by means of a pin G passing through the perforations H.

The cultivator-blades I are secured to the side bars C by means of brackets J and bolts or set-screws J'. The width of the cultivator can be adjusted by moving the rear ends of the side bars C toward the central beam A, the several perforations H in the braces E allowing the same to be fixed at various distances.

The central member 1 is provided with a wheel K at one of its front corners, and with the wheel L at the rear corner diagonal therefrom to serve as supports. These wheels are journaled upon the short arms $m$ $n$ of bent axles M N, which axles are provided with the channel O, in which the spline P of lever Q fits, so that the lever Q is adapted to turn the main arm of the axle, and the axle is allowed to slip through the lever, thus permitting the extension and contraction of the frame and also allowing the axles M N to be withdrawn to remove the wheels from the cultivator, if desired.

The axle N is secured to the side bars C and the central beam A by means of swivel-clamps R S, which are respectively adjustably attached to such bar and beam by means of set-screws T. The upper ends of levers Q Q' are pivoted to the operating-rod U, which is connected with rack-lever V by means of pin W, fixed upon such rod and working in slot X, so that the movement of lever V, which is pivoted to the central beam, will operate to turn the axles M N simultaneously. A rack $l$ is provided to secure the lever in the position desired.

When it is desired to elevate the cultivator-blades I, the lever V is operated to turn the axle N M to throw the short arm downward, thus forcing the center of the wheels into a lower position relative to the frame, so that the contact of the wheels with the ground will lift the frame, and thereby lift the cultivator-blades.

The swivels Y Y' allow the bearings of the axle N to adjust themselves to the position of the axle as the frame is extended or contracted.

Z is a connecting-bar for securing the several members 1 2 3 to each other. It is secured to the several members by means of standards $a$ $a'$ $a''$, which are secured to the central beams A, near the middle thereof.

$b$ $b$ represent clamps, by means of which the bar Z is secured to the standard $a$. Crotch-pieces $c$ are swiveled to the side bars C to receive and brace the bar Z in its intermediate length. The crotch-pieces $c$ are swiveled, in order to allow the adjustment of side bars C in extending and contracting the frame of the members.

$d$ $d$ represent set-screws for securing clamps $b$. At the front of the several members I provide an additional brace-bar $e$, which is bent into loops $f$ to allow the machine to pass over growing corn without breaking the corn. The bar $e$ is secured to the cross-bar B of the frame by means of clips $g$, and can be removed at pleasure.

The bar Z is adapted by means of its clamps and the crotches $c$ for vertical adjustment, so that when it is desired to use the cultivator in cultivating growing corn or similar plants in rows the bar may be lifted, as shown; but when desired the bar may be lowered in its position, thereby making its connection with the several members more rigid than is possible when the bar is lifted, as shown.

The points I are socketed to fit upon the shank I', as shown in Fig. 2, in which the point is shown attached to the shank and also removed therefrom. A set-screw $r$ is provided to secure the point to the shank, and the natural tendency of the friction of the point in passing through the soil will be to force the point more firmly upon the shank. $t$ $t$ are wings attached to the side of the shank to assist in throwing the earth to form a furrow.

$v$ represents a screw securing the wing $t$ to the shank.

Now having described my invention, what I claim as new, and desire to secure by Letters Patent, is—

1. In a cultivator, the combination set forth of the adjustable members 1 2 3, provided with standards $a$ $a'$ $a''$, the connecting-bar Z, clamps $b$, and swiveled crotch-pieces $c$.

2. In a cultivator such as described, the combination set forth of the frame of the cultivator, bent axle N, provided with the channel O, bent arm $n$, wheel L, journaled thereto, swivel Y, clamp S, lever Q, provided with the spline P, the operating-rod U, pivoted to such lever, and means for operating such rod.

3. In a cultivator, the combination set forth of the central beam A, cross-bar B, side bar C, pivoted thereto, braces E, means for securing the same to the central beam, the clamps R S, provided with set-screws T, the swivels Y Y', bent axles N $n$, provided with channel O, lever Q, provided with spline P, and means for operating such lever, substantially as set forth.

WILLIAM DAVIS.

Witnesses:
JAMES R. TOWNSEND,
L. J. SPENCER.